(No Model.)
W. G. CAREY & A. A. BALL, Jr.
TROLLEY BREAKER.
No. 539,854. Patented May 28, 1895.
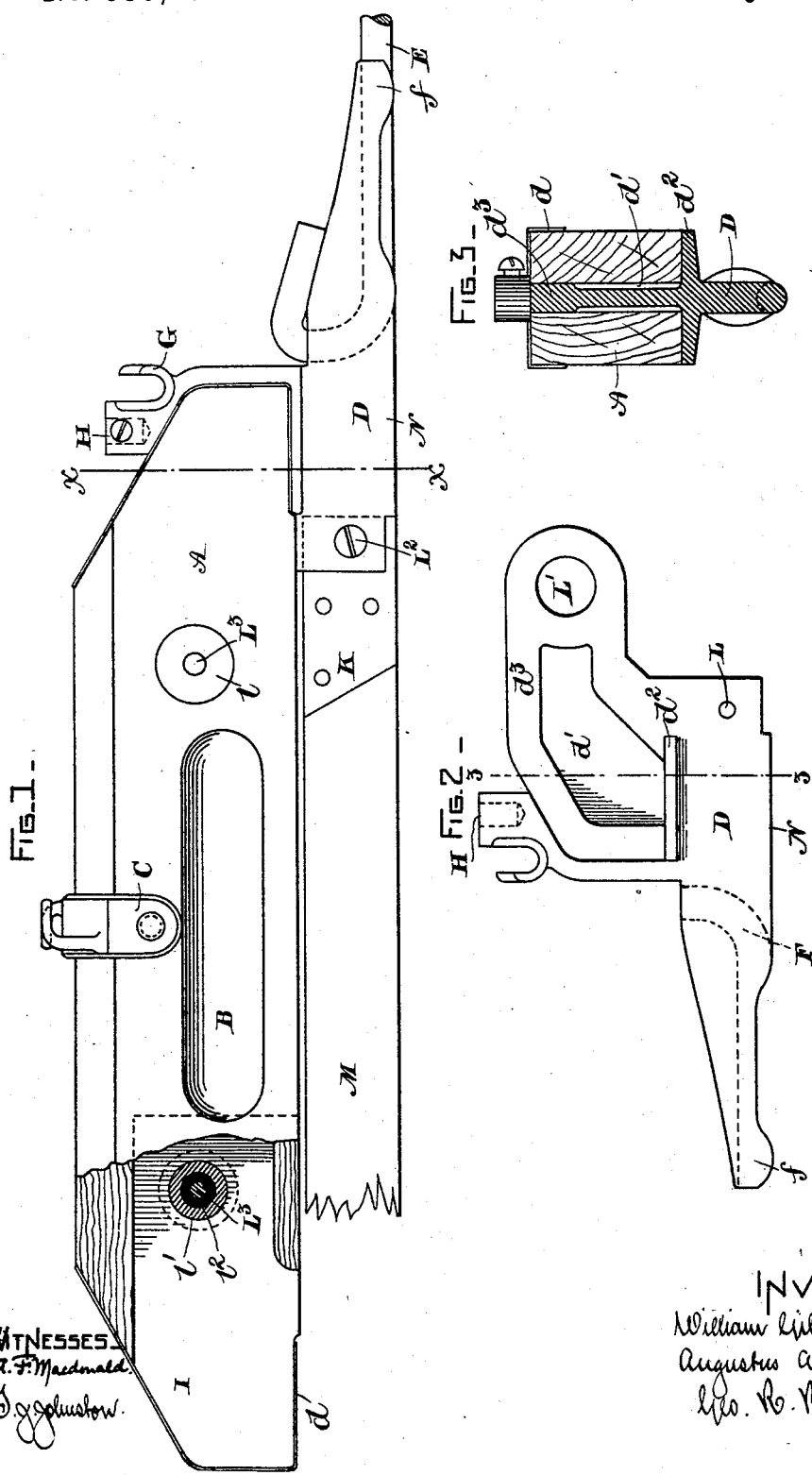
WITNESSES
a. F. Macdonald
J. J. Johnston
INVENTORS
William Gibson Carey and
Augustus A. Ball, Jr.
by Geo. R. Blodgett
Atty.
THE NORRIS PETERS CO., PHOTO-LITHO., WASHINGTON, D. C.

United States Patent Office.

WILLIAM GIBSON CAREY AND AUGUSTUS A. BALL, JR., OF SCHENECTADY, NEW YORK, ASSIGNORS TO THE GENERAL ELECTRIC COMPANY, OF SAME PLACE.

TROLLEY-BREAKER.

SPECIFICATION forming part of Letters Patent No. 539,854, dated May 28, 1895.

Application filed November 15, 1894. Serial No. 528,876. (No model.)

*To all whom it may concern:*

Be it known that we, WILLIAM GIBSON CAREY and AUGUSTUS A. BALL, Jr., citizens of the United States, residing at Schenectady, in the county of Schenectady, State of New York, have invented certain new and useful Improvements in Trolley-Breakers, of which the following is a specification.

Our invention relates to trolley breakers or line-section insulators; and has for its object to construct a trolley breaker with a straight under-run for the traveling contact of the trolley, one with efficient insulation so that an arc will not be carried across from one side to the other of the insulator, and in which the metallic end-pieces are so constructed as to put upon the breaker a transverse strain by the longitudinal pull of the trolley wire.

To the ends pointed out we construct our improved trolley breaker of a piece of wood of considerable strength and in each end we make a slot in which we insert a metallic end-piece, more fully described hereinafter. At the inner end of the slot we bore through a rivet hole, and through this we pass a rivet with an insulating bushing which serves to retain in place the metallic end-pieces. Upon the under side of the body part of the insulator flanges of the metallic end-piece engage with the wood and these are so situated that by a direct pull of the trolley wire they tend to move upward around the rivet as a center, thus throwing upon the wood of the body a transverse strain which it is better capable of resisting than if the rivet were to take the entire strain resisted only by the tensile strength of the wood.

As ordinarily constructed, very many trolley breakers depend only upon the strength of the rivet and the tensile strength of the insulating material, the pull coming upon the rivet in a direct line, whereas by our construction we depend upon the cramping of the insulating portion between the flanges of the end-piece and the rivet provided with its envelope and insulating bushing affording a good bearing surface; and thus with the same amount of material we get a greatly increased strength, or the same strength as ordinary constructions with a less amount of material.

Our improved trolley breaker is illustrated in the accompanying drawings, in which—

Figure 1 is a side elevation, partly broken away, of the entire insulator. Fig. 2 is a side elevation of one of the end pieces removed, and Fig. 3 is a section upon the line 3 3 of Fig. 2.

A is the body piece of the insulator, which we prefer to make of hickory wood, although it may be made of other insulating material having the necessary strength. This piece is of substantially rectangular shape and, as indicated in Fig. 1, is sloped away on its ends and is provided with a slot I, shown best at the left of Fig. 1, for the insertion of the metallic end-pieces the flanges of which bear against its bottom.

B shows a groove or channel upon one side affording a convenient hold upon the insulator, there being a corresponding channel upon the other side. Not shown in the drawings.

C is an attachment or support for the span-wire, of any usual or accustomed form.

In Fig. 2, D is the metallic end-piece to which we have referred. This is provided with a countersunk portion $d'$ around which are raised flanges $d^3$, the countersinking being made to save weight, and to facilitate the insertion of the end-piece in the slot I of the main insulating body. A flange $d^2$ bears against the bottom of the body piece when the end-piece is put in place. Other forms of fastening may be arranged and will suggest themselves, the principle being that one of the fastenings shall be above the bottom line of the insulating body and the other shall be substantially at the bottom line, so that, as the lower one of the attachments or bearings is pulled by the action of the trolley wire, it will tend to move around the other one as a center and thus exert a transverse strain upon the body piece, as already pointed out in our statement of invention.

The trolley wire E passes through a channel F in the end-piece D and is returned upon itself to form a secure attachment. At $f$ we have indicated the usual ear arranged to be cramped over the trolley wire so that, when the wire is soldered in place, it may be firmly held.

G is a clip or channel in which is held the feeder wire, and at H we have shown a hole with a set-screw in which may be inserted a connecting wire in case it is desired at any time to connect the two sections usually insulated from each other by the trolley-breaker.

At L we show a hole for the screw L² which secures in place the under-run bar M, provided with a metallic envelope K. This bar is of any usual or ordinary form, and forms no part of the present invention except in combination with the other parts shown.

At L', Fig. 2, is shown a hole through which passes an insulated rivet L³, provided with a washer $l$.

The precise arrangement of the parts is best shown at the left in Fig. 1, where L³ is the rivet, shown cut away. $l^2$ is an insulating bushing, and $l'$ is a second bushing of metal surrounding the insulating bushing and affording a bearing in the aperture L' in the metallic end-piece, it being understood that the washer $l$ is also protected by a second washer of insulating material beneath it. A metallic plate $d$ embraces the ends of the main insulating body A, and is secured thereto in any convenient manner. It will be seen that the lower part N of the metallic end-piece D is in line with the lower part of the bar M and of the metallic envelope K surrounding the bar, so that, as the trolley passes off the trolley wire F, there is no jump or shock, as the bottom of the various parts is in the horizontal plane of the trolley wire. The line being preserved, the wheel passes smoothly along and no special attention is necessary on the part of the crew.

By the construction which we have described we get a light and strong trolley breaker having the advantage herein pointed out of putting the strain upon the body in the way which it is best calculated to resist, and the further advantage of the straight under-run, not found in other constructions with which we are familiar.

What we claim as new, and desire to secure by Letters Patent of the United States, is—

1. In a trolley-breaker, a main supporting part or body of insulating material, and metallic end-pieces secured to the body part by a bearing above the bottom line of the body and a second bearing at such bottom, substantially as described.

2. In a trolley-breaker, a body part of insulating material, and metallic end-pieces secured thereto by a bearing above the bottom line of the body and a second bearing against such bottom, the bottom line of the end-pieces being in substantially the horizontal plane of the trolley wire.

3. In a trolley-breaker, a body part of insulating material, metallic end-pieces secured thereto by bearings above the bottom line of the body and other bearings against the bottom, the bottom line of the end-pieces being in substantially the horizontal plane of the trolley wire, and a connecting bar of insulating material in the plane of the bottom line of the end-pieces and forming a runway for the trolley.

4. As a new article of manufacture, a body part of substantially rectangular section for a trolley-breaker, composed of insulating material, having its ends sloped off, and a slot in each end for securing the metallic end-pieces in position.

5. As a new article of manufacture, a metallic end-piece for a trolley breaker, having two bearings, one above the horizontal plane of the trolley wire, and the other substantially in such plane.

6. As a new article of manufacture, a metallic end-piece for a trolley-breaker having a bottom portion in line with the part to which the trolley-wire is attached and provided with two bearings, one adapted to co-operate with a part of the body of the trolley-breaker above its bottom line and the other adapted to engage the bottom of the body part.

7. As a new article of manufacture, a metallic end-piece for a trolley-breaker, having its bottom in line with the attachment of the trolley-wire and provided with two bearings, one a pin hole adapted to co-operate with a pin through the body portion of the trolley-breaker at a point above its bottom line, and the other a flange adapted to bear against the bottom of the body part.

8. A trolley breaker for an electric railway, constructed substantially as herein described, consisting of a body part of insulating material having a substantially rectangular shape and cut-away ends, metallic end-pieces in slots in the cut-away ends, each of the end-pieces having two bearings co-operating with the body part, one a pin above the bottom line of the body, the other a flange bearing against such bottom, the bottom line of the end-pieces being substantially in the horizontal plane of the trolley-wire, and the two end-pieces being connected by a wooden bar forming a runway for the trolley, the bottom line of the wooden bar being in the plane of the end-pieces so as to form a substantially horizontal straight runway.

In witness whereof we have hereunto set our hands this 14th day of November, 1894.

WILLIAM GIBSON CAREY.
AUGUSTUS A. BALL, JR.

Witnesses:
B. B. HULL,
A. F. MACDONALD.